March 22, 1966     T. I. DUFFY     3,241,858
SHOCK ABSORBING FORK FOR BICYCLES
Filed Sept. 1, 1964     2 Sheets-Sheet 1
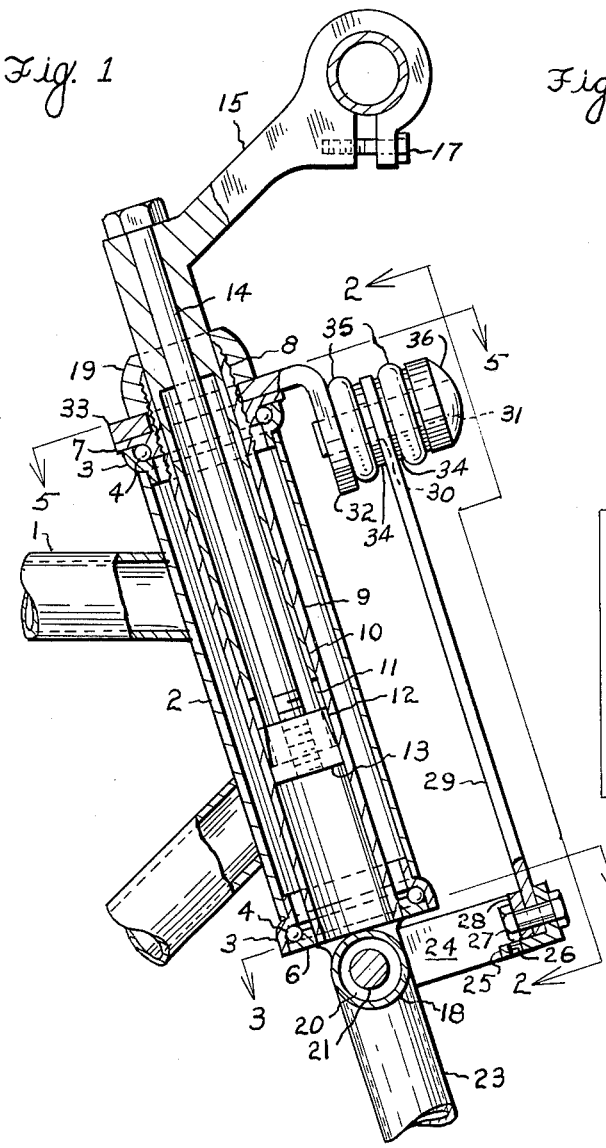
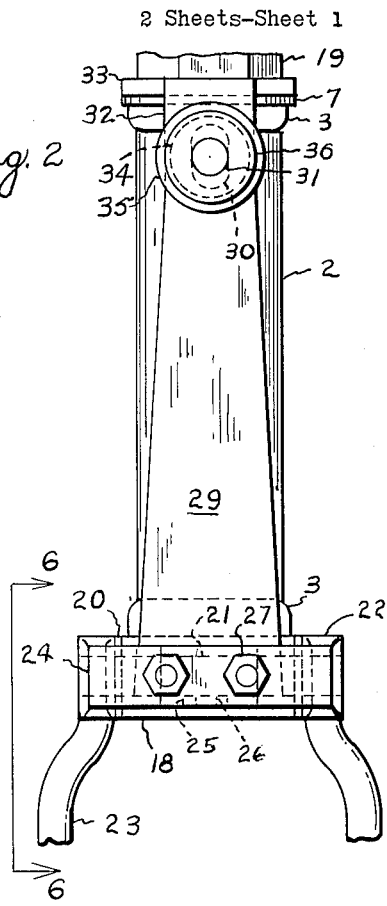
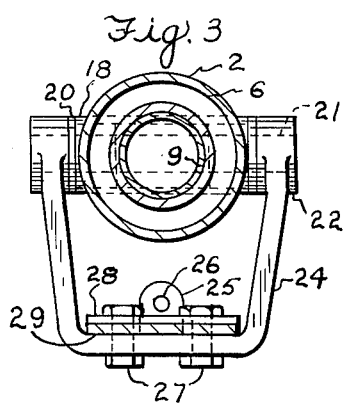
INVENTOR.
THOMAS I. DUFFY
BY *Allan J. Murray*
ATTORNEY

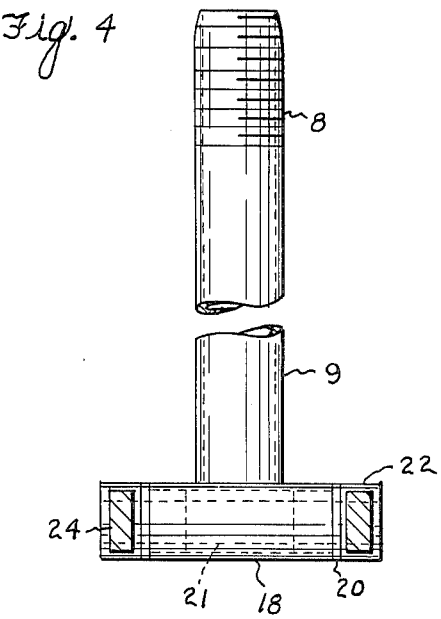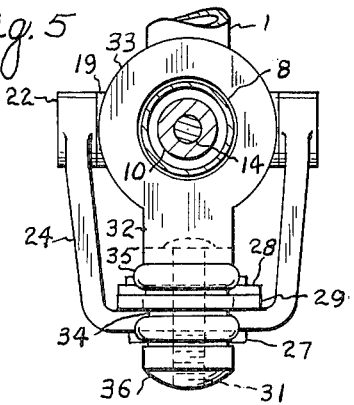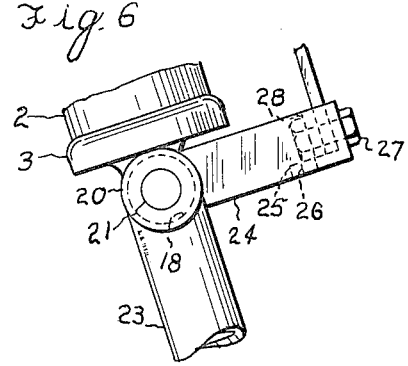

United States Patent Office 3,241,858
Patented Mar. 22, 1966

3,241,858
SHOCK ABSORBING FORK FOR BICYCLES
Thomas I. Duffy, Grand Haven, Mich., assignor of one-half to Ethel Benedict
Filed Sept. 1, 1964, Ser. No. 393,692
6 Claims. (Cl. 280—276)

This invention relates to shock absorbing constructions for steering controls of foot-propelled vehicles, and more particularly to such devices as provide for adjusting such constructions to compensate for the varying weights of persons using such vehicles.

An object of the invention is to provide a bracket surmounting a steering head of such a vehicle, and to provide a bracket carried beneath such steering head, said latter bracket being rigidly interconnected to and pivotal with a steering fork upon pivot means disposed beneath said steering head, and mounting said fork, and to further provide a spring, elongated to extend between said brackets and having its respective ends secured to said respective brackets.

A further object is to dispose elements of a resilient material between said spring and one or more of said brackets to further contribute to the shock absorbant qualities of said construction.

Still a further object is to provide threaded means threadedly rotatable to adjust tension on said spring according to the weight of the person riding such a vehicle.

A further object of the invention is to so pivotally mount a wheel mounting fork upon said pivot means that a fender secured upon said fork, and a wheel mounted in said fork, may move in unison with said fork about the axis of said pivot means.

Still another object of my invention is to provide a tubular steering post received in such steering head and rotatable therein, and to secure to the lower end portion of said steering post, as by welding, a tubular pivot sleeve extending transversely to the longitudinal axis of said steering post, and to provide in the end portions of said tubular pivot sleeve bushings to receive and afford rotation of said pivot element.

These and various other objects are attained by the invention described herein and illustrated in the accompanying drawings, wherein:

FIG. 1 is a vertical, partial, sectional view through the axis of steering rotation, of the steering head of a bicycle.

FIG. 2 is a vertical, partial, view of said steering head and of my attached invention taken on line 2—2 of FIG. 1.

FIG. 3 is a partial, sectional view on line 3—3 of FIG. 1 illustrating said lower bracket.

FIG. 4 is a partial, front elevational view of my improved steering post, omitting the steering head, and spring shock absorbing mechanism, and illustrating the transverse relationship of said tubular pivot sleeve in position beneath said steering post, with the upper portion of said fork, shown in partial section.

FIG. 5 is a partial, sectional view on line 5—5 of FIG. 1, showing the upper end portion of said steering post assembly with said upper bracket and said resilient elements associated therewith.

FIG. 6 is a vertical, partial, elevational view on line 6—6 of FIG. 2.

In these views the reference character 1 represents the forward portion of the bicycle frame, having a steering head 2. The upper and lower opening of such steering head conventionally receive conventional bearing cups 3, which in turn receive ball bearings 4. Said bearings are respectively maintained in position by a lower race 6, and an upper race 7, said races being applied and described hereinafter.

An upper threaded portion 8 of a steering post 9 is slidingly received in the stem 10 of a gooseneck 15. The lower end portion of said stem is formed with diametrically opposite longitudinally elongated slots 11. Said slots 11 receive keys 12 oppositely diametrically formed on a tapered expander 13. The engagement of said keys 12 in said slots 11, resists rotation of said tapered expander 13, as the latter is drawn upwardly by a bolt 14 with a resultant expansion of the slotted portion of said stem 10 to firmly, frictionally engage said portion against the interior surface of said steering post 9. A handle bar 16 is shown in section within the upper portion of said gooseneck 15, the upper portion being slotted, and drilled and tapped to receive a screw 17 to compress said slotted upper portion and firmly engage said handle bars.

The lower end portion of the steering post 9 extends beneath the tubular steering head 2. A tubular pivot sleeve 18 is disposed, as best seen in FIG. 4, beneath the lower end portion of the steering post, transversely to the longitudinal axis of such steering post, and is maintained in such position as by welding. The aforesaid lower race 6 is slid downwardly over such steering post which is then upwardly inserted through the steering head to engage said ball bearings in said lower race. Said upper race threadedly engages the threaded upper portion 8 of said steering post 9 and is downwardly turned upon said thread to seat upon the upper bearing aforementioned. A nut 19 is also received upon said upper threaded portion 8 to maintain the assembly.

In the end portions of the tubular pivot sleeve 18 are inserted bushings 20, which are preferably of nylon or some other material which will not require lubrication. Pivotal within said bushings is a pivot element 21 having end portions projecting beyond each such bushing to receive the appropriately apertured upper end portions 22 of a wheel mounting fork. The bifurcations 23 of said fork are integrally joined at their upper end portions by a bracket 24, said bracket integrally, forwardly carries a fender mounting lug 25, drilled and tapped as at 26 to receive a screw to mount a fender (not shown). Nuts and bolts 27 or the like, in combination with a retaining plate 28, as best seen in FIGS. 1 and 3, secure the lower end portion of a flat, elongated spring 29. The upper portion of said spring is formed with an elongated slot 30, which receives a threaded stud 31 having one end thereof rigidly fixed in a bracket 32 as by welding.

Said bracket is formed with an annular portion 33 appropriately apertured to be received slidingly over the upper end portion 8 of said steering post, where it is secured firmly in position by the aforesaid nut 19. A washer 34 is disposed on each side of said upper end portion of said spring 29, as illustrated in FIG. 1, and one or more annular elements 35 of a resilient material are disposed adjacent to each washer. Terminally the threaded stud 31 receives a nut 36 threaded thereon, so that such nut may be appropriately turned to move either toward or away from said bracket 32, with a resultant increasing or diminishing of tension upon the spring 29.

As may now be seen, the described construction affords a pivotal action about the axis of the pivot element 21 in response to shocks and vibration transmitted from a wheel and tire (not shown) rolling upon uneven surfaces whereon a bicycle may be traveling. It will be observed that provision of means for attaching a fender to the aforesaid bracket 24, affords movement as a unit of said wheel fork, such wheel, and such fender about said axis.

Such motion, resulting from shocks and vibration as the vehicle travels, transmits said shocks and vibration to said spring element 29. Said spring flexing forwardly or rearwardly in the plane of travel of the vehicle, tends to absorb most of such vibration and shock. The resilient annular elements 35 tend further to absorb shock and vibration, and the elongated slot 30 affords some upward and downward movement of the upper end portion of said spring upon said threaded stud 31.

Such up and down motion may be increased or decreased by appropriate adjustment of tension by the nut 36. Said adjustment of tension may, of course, be utilized to compensate for varying weights of riders using the vehicle.

It is belived to be worthy of note that my improved shock absorbing construction for bicycles entails no change in the bicycle frame, steering head, bearing cups, bearing races, goose neck, or means of applying same, and thus said improved shock absorbing construction can be applied in the existing manufacture of bicycles with a minimum change of production, and production methods.

What I claim is:

1. In combination with a tubular steering head of a bicycle or the like,
    (a) a steering post rotatably received in said head, and having a lower end portion extending beneath said head,
    (b) pivot means carried by and beneath said lower end portion,
    (c) a wheel mounting fork secured to said pivot means and having limited rotation about the axis of said pivot means responsive to shocks and vibration resulting from vehicle travel,
    (d) a first bracket surmounting the steering post and formed with a flange,
    (e) a second bracket formed integrally with and conjoining the bifurcations of said fork,
    (f) a flat, elongated spring extending between said first and second brackets and having a lower end portion rigidly secured to the second bracket, and having an upper end portion secured to said flange,
    (g) a threaded stud secured to and protruding from said flange, said stud passing through the upper end portion of said spring, and said upper end portion having an aperture to receive said stud,
    (h) a nut received on the stud and rotatable thereon to tightend or loosen the engagement of the spring and the flange.

2. The combination as set forth in claim 1, said spring being so mounted as to flex in the plane of travel of the vehicle, and said aperture being an elongated slot, whereby limited sliding travel of said upper end portion is afforded relative to said stud, and whereby said nut may be adjusted to tighten or loosen the engagement between the spring and said flange, and thus resist or facilitate said sliding travel.

3. The combination as set forth in claim 2,
    (i) one or more elements of resilient material interposed between the upper end portion of the spring and said flange and nut, to further absorb shocks and vibrations.

4. In combination with a tubular steering head of a bicycle or the like,
    (a) a steering post rotatably received in said head, and having a lower end portion extending beneath said head,
    (b) pivot means carried by and beneath said lower end portion,
    (c) a wheel mounting fork secured to said pivot means and having limited rotation about the axis of said pivot means responsive to shocks and vibration resulting from vehicle travel,
    (d) a first bracket surmounting said head,
    (e) a second bracket carried by said wheel mounting fork,
    (f) a flat, elongated spring interconnecting said brackets to yieldably resist rotation about the axis of said pivot means and absorb said shocks and vibration, and having one end rigidly secured to one of said brackets and the other end slidably secured to the other said bracket,
    (g) a threaded stud secured to and protruding from the last mentioned bracket, said stud passing through the respective end portion of the spring and said respective end portion having an aperture to accept said stud,
    (h) a not received upon said stud (g) and rotatable thereon to adjust tension upon said respective end portion of said spring (f),
whereby said spring flexes responsive to said limited rotation about the axis of said pivot means, to absorb said shocks and vibration.

5. In the combination as set forth in claim 4, said spring being so mounted as to flex in the plane of travel of the vehicle, and said aperture being an elongated slot, whereby limited sliding travel of said respective end portion occurs relative to said stud, and whereby said nut may be rotated to increase or decrease said tension, and thus resist or reduce resistance to said sliding motion.

6. The combination as set forth in claim 5,
    (i) a flange formed upon said last mentioned bracket, and said respective end portion being secured to said flange.

References Cited by the Examiner

UNITED STATES PATENTS

| | | | |
|---|---|---|---|
| 921,471 | 5/1909 | Shilling | 267—9 |
| 1,397,845 | 11/1921 | Viratelle | 280—277 |
| 1,761,967 | 6/1030 | Blackmore | 267—30 |
| 2,540,585 | 2/1951 | Kranz. | |

FOREIGN PATENTS

| | | | |
|---|---|---|---|
| 544,594 | 6/1922 | France | 280—276 |
| 545,971 | 10/1922 | France | 280—276 |
| 564,688 | 10/1923 | France | 280—276 |
| 192,131 | 1/1923 | Great Britain. | |

A. HARRY LEVY, *Primary Examiner.*

KENNETH H. BETTS, *Examiner.*